(12) United States Patent
DiMeo et al.

(10) Patent No.: US 8,036,634 B2
(45) Date of Patent: Oct. 11, 2011

(54) SYSTEM AND METHOD FOR AUTOMATIC STORAGE AND RETRIEVAL OF EMERGENCY INFORMATION

(75) Inventors: David M. DiMeo, Northville, MI (US); Joseph J. Berry, Northville, MI (US); Sukhwinder Wadhwa, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 12/406,281

(22) Filed: Mar. 18, 2009

(65) Prior Publication Data

US 2010/0240337 A1 Sep. 23, 2010

(51) Int. Cl.
*H04M 11/04* (2006.01)
*G01C 21/00* (2006.01)
*G10L 13/00* (2006.01)

(52) U.S. Cl. ............... 455/404.1; 455/41.2; 455/41.3; 455/347; 455/575.9; 455/569.2; 340/438; 340/901

(58) Field of Classification Search ............ 455/575.9, 455/556.1, 404.1–404.2, 414.1–414.4, 90.1–90.3
See application file for complete search history.

(56) References Cited

U.S. PATENT DOCUMENTS

| | | | |
|---|---|---|---|
| 6,680,998 B1 * | 1/2004 | Bell et al. | 379/37 |
| 2005/0037730 A1 | 2/2005 | Montague | |
| 2006/0224305 A1 | 10/2006 | Ansari et al. | |
| 2006/0262103 A1 * | 11/2006 | Hu et al. | 345/173 |
| 2006/0288053 A1 | 12/2006 | Holt et al. | |
| 2007/0243853 A1 * | 10/2007 | Bumiller et al. | 455/404.1 |
| 2008/0139118 A1 | 6/2008 | Sanguinetti | |
| 2008/0140665 A1 | 6/2008 | Ariel et al. | |
| 2008/0180237 A1 * | 7/2008 | Fayyad et al. | 340/461 |
| 2008/0243545 A1 | 10/2008 | D'Ambrosia et al. | |

OTHER PUBLICATIONS

Joseph J. Berry, et al., U.S. Appl. No. 11/769,346, filed Jun. 27, 2007, Method and System for Emergency Notification.
Joseph J. Berry, et al., U.S. Appl. No. 12/399,513, filed Mar. 6, 2009, Method and System for Emergency Call Handling.
Kermit Whitfield, "A hitchhiker's guide to the telematics ecosystem", Automotive Design & Production, Oct. 2003, http://findarticles.com, pp. 1-3.
International Searching Authority, Patent Cooperation Treaty, The International Search Report and the Written Opinion of the International Searching Authority for the corresponding PCT Application No. PCT/US2010/027451 mailed May 20, 2010.
Santa Cruz ARES Handbook, by Wayne Thalls, KB6KN Santa Cruz ARES, Santa Cruz ARES 1990.
Ford Motor Company, "Navigation System: SYNC," Owner's Guide Supplement, SYNC Version 1 (Jul. 2007).
Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).

\* cited by examiner

*Primary Examiner* — Ajit Patel
*Assistant Examiner* — Erica Navar
(74) *Attorney, Agent, or Firm* — Jennifer M. Stec; Brooks Kushman P.C.

(57) ABSTRACT

A vehicle communication system may retrieve "in case of emergency" (ICE) information from a wireless device. The ICE information may include contact information, medical information, etc., and may be transferred to an emergency provider, if the vehicle communication system places an emergency call. The information may also be retrieved at some point before an emergency call is placed and stored in a memory circuit of the vehicle communication system.

10 Claims, 4 Drawing Sheets

SYSTEM AND METHOD FOR AUTOMATIC STORAGE AND RETRIEVAL OF EMERGENCY INFORMATION

TECHNICAL FIELD

The illustrative embodiments generally relate to a system and method for automatic storage of emergency information by a vehicle-based computing system and/or automatic retrieval of stored emergency information.

BACKGROUND

Many emergency service providers and other organizations are encouraging people to add In Case of Emergency (ICE) information to cell phones and other portable, wireless devices. For many cell phones, adding this information consists of adding a new contact entry called "ICE" (or "ICE1", "ICE2", etc. for multiple contacts). With this entry are included one or more phone numbers that can be called in an emergency situation.

Certain devices may also have the capability to store additional notes with a contact. This notes area could be used to add any relevant comments, such as critical medical conditions or allergies, a home address, and email address, etc.

Additionally, phones may be provided with ICE information as a standard feature. While not an industry standard yet, this feature could include storage of any or all of the above listed information, as well as additional information such as next-of-kin, etc. For example, if an emergency arose, a person may want a doctor notified, but if that person were killed, they may want a different party notified.

SUMMARY OF ILLUSTRATIVE EMBODIMENTS

In a first illustrative embodiment, a vehicle communication system includes a computer processor in communication with a memory circuit. The system also includes a transceiver in communication with the processor and operable to communicate with one or more wireless devices.

In this embodiment, the processor may establish communication with a first wireless device through the transceiver and search an address book of a first wireless device for ICE information.

Additionally, the processor may transfer ICE information stored on the wireless device to the memory, where the information can be stored for later use.

In a second illustrative embodiment, the vehicle communication system may connect to an emergency operator through the first wireless device. In addition to connecting to the emergency operator, the processor may retrieve stored ICE information and provide retrieved ICE information to the emergency operator.

BRIEF DESCRIPTION OF THE DRAWINGS

Other aspects and characteristics of the illustrative embodiments will become apparent from the following detailed description of exemplary embodiments, when read in view of the accompanying drawings, in which.

DETAILED DESCRIPTION OF ILLUSTRATIVE EMBODIMENTS

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
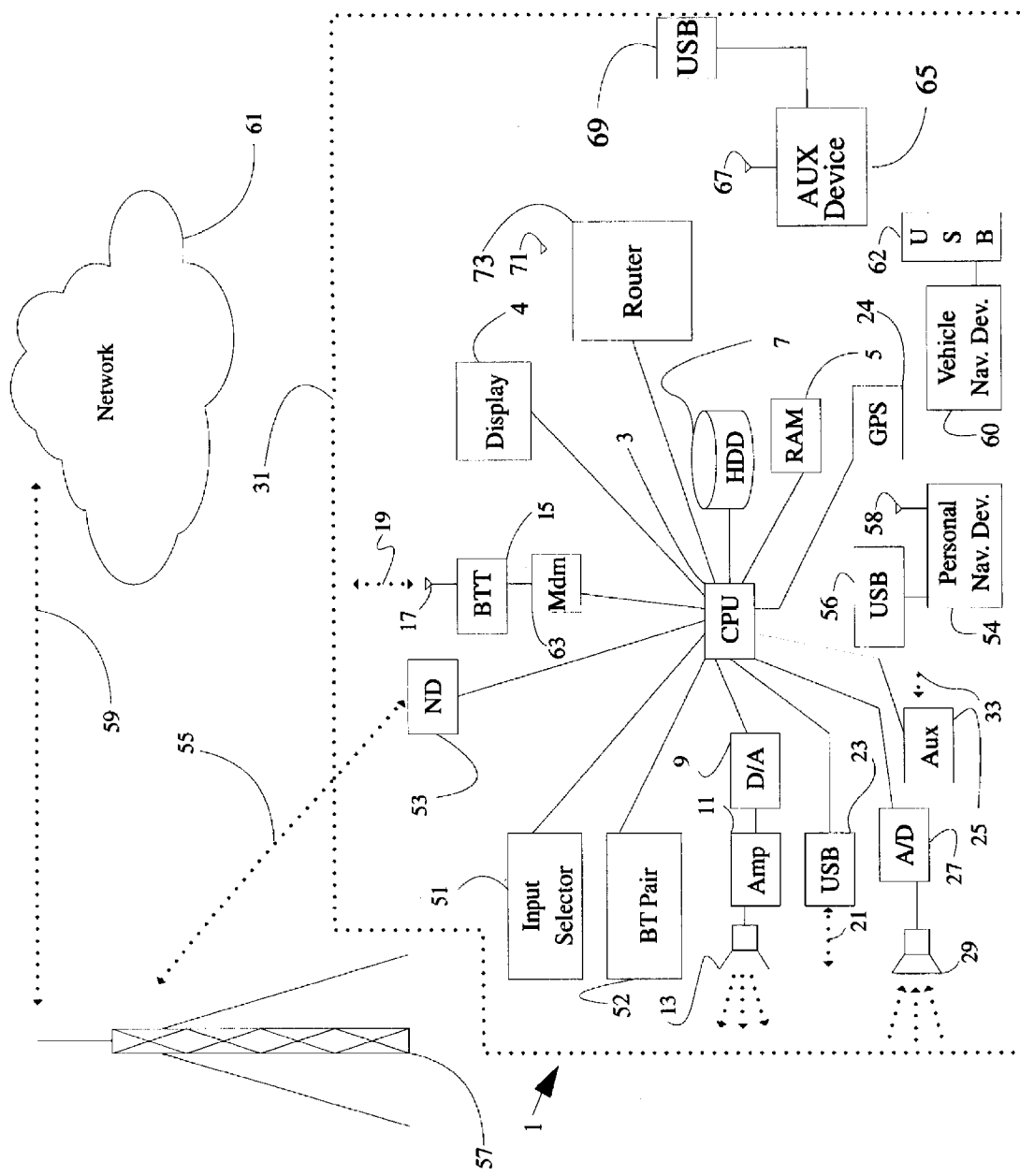
FIG. 1 shows an exemplary illustrative vehicle-based computing system.

FIG. 1 illustrates system architecture of an illustrative onboard communication system usable for delivery of directions to an automobile. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7 (both of which are also memory circuits). In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BlueTooth device such as PND 54 or a USB device such as vehicle navigation device 60 along the bi-directional data streams shown at 19 and 21 respectively.

In one illustrative embodiment, the system 1 uses the BlueTooth transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BlueTooth transceiver 15 can be instructed through a button 52 or similar input, telling the CPU that the onboard BlueTooth transceiver will be paired with a BlueTooth transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BlueTooth transceiver to complete wireless communication with a remote BlueTooth transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BlueTooth transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
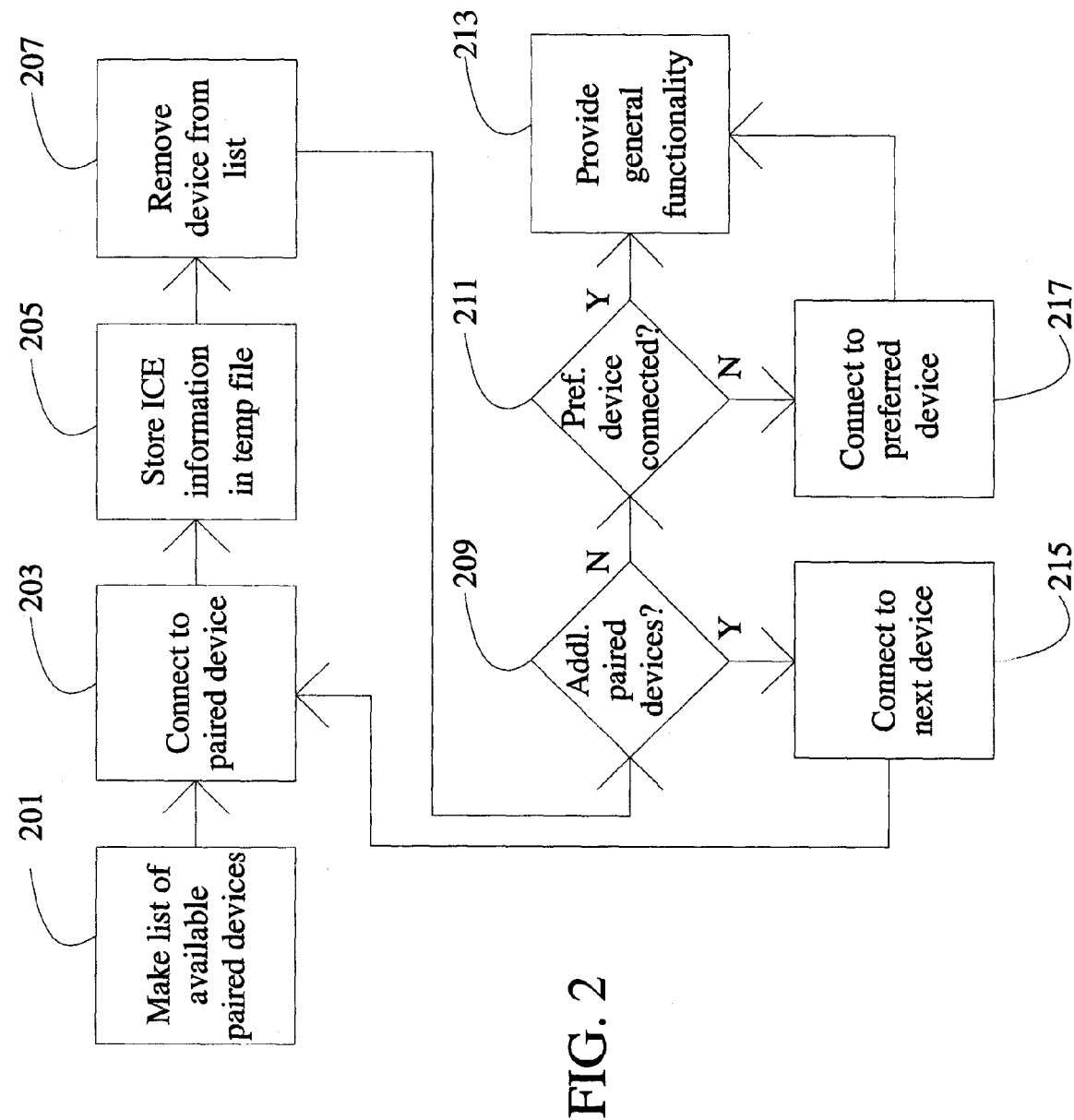
FIG. 2 shows an exemplary illustrative process for storing emergency information.

FIG. 2 shows an exemplary illustrative process for storing emergency information. In at least one illustrative embodiment, a vehicle-based computing system includes a transceiver capable of communication with a plurality of wireless devices. If, for example, the communication is done over a BlueTooth connection, then one or more wireless devices may have been previously "paired" with the vehicle-based computing system. Further, it is possible that more than one passenger will have a paired wireless device in their possession within range of the transceiver.

Since each device may have different emergency information stored thereon, it may be desirable to store all relevant information in at least a temporary storage, in case the system needs to retrieve the information in the event of an accident.

In this illustrative embodiment, the vehicle-based computing system detects each paired or available wireless device and makes a list of available devices 201. The system then connects to a primary device first 203. If no primary device is designated or available, the system could connect to any available device on the list.

The vehicle-based system retrieves any ICE information (or other emergency information, as used herein, ICE refers to all emergency contact information, including, but not limited to, phone numbers, addresses, medical records, next-of-kin names, and/or any other information that may be relevant in an emergency situation) from the device and stores it in a temporary location in memory 203. In this illustrative embodiment, the information is only stored temporarily so that the information can be updated whenever new passengers are present. The information could, however, be stored permanently, with, for example, a profile related to a particular device, and then the system could note that the device is present in range of the transceiver and access the stored information when needed.

Once the information stored on a particular device has been stored at least in temporary memory of the vehicle-based communication system, the system removes the device from the list of available devices 207 and checks to see if there are any devices remaining on the list 209.

If devices remain, the system will connect to the next device on the list 215, retrieve and store the ICE information 205, and remove the device from the list 207. If there are no devices remaining, the system checks to see if the system is presently connected to a preferred device 211.

Since, in this illustrative embodiment, each device is sequentially connected (as opposed to simultaneously, which is also possible) to retrieve the ICE information, it may be the case that the last device connected is not a preferred device. Accordingly, the system will check to ensure that a preferred device is connected.

In another illustrative embodiment, a plurality of devices, including a preferred device, may be connected at the same time, and the system may simply ensure that future communication (post ICE information gathering) to remote networks is done through a preferred device. Or, there may be no device preference at all, and the last or any connected device may be sufficient and appropriate for provision of a wireless connection to a remote network.

If the system is not connected to a preferred device, the system establishes a connection with a preferred device 217 and then provides general functionality 213. If the system is already connected to a preferred device, the system proceeds to provision of general functionality without re-connecting to a preferred device.

Figure 3:
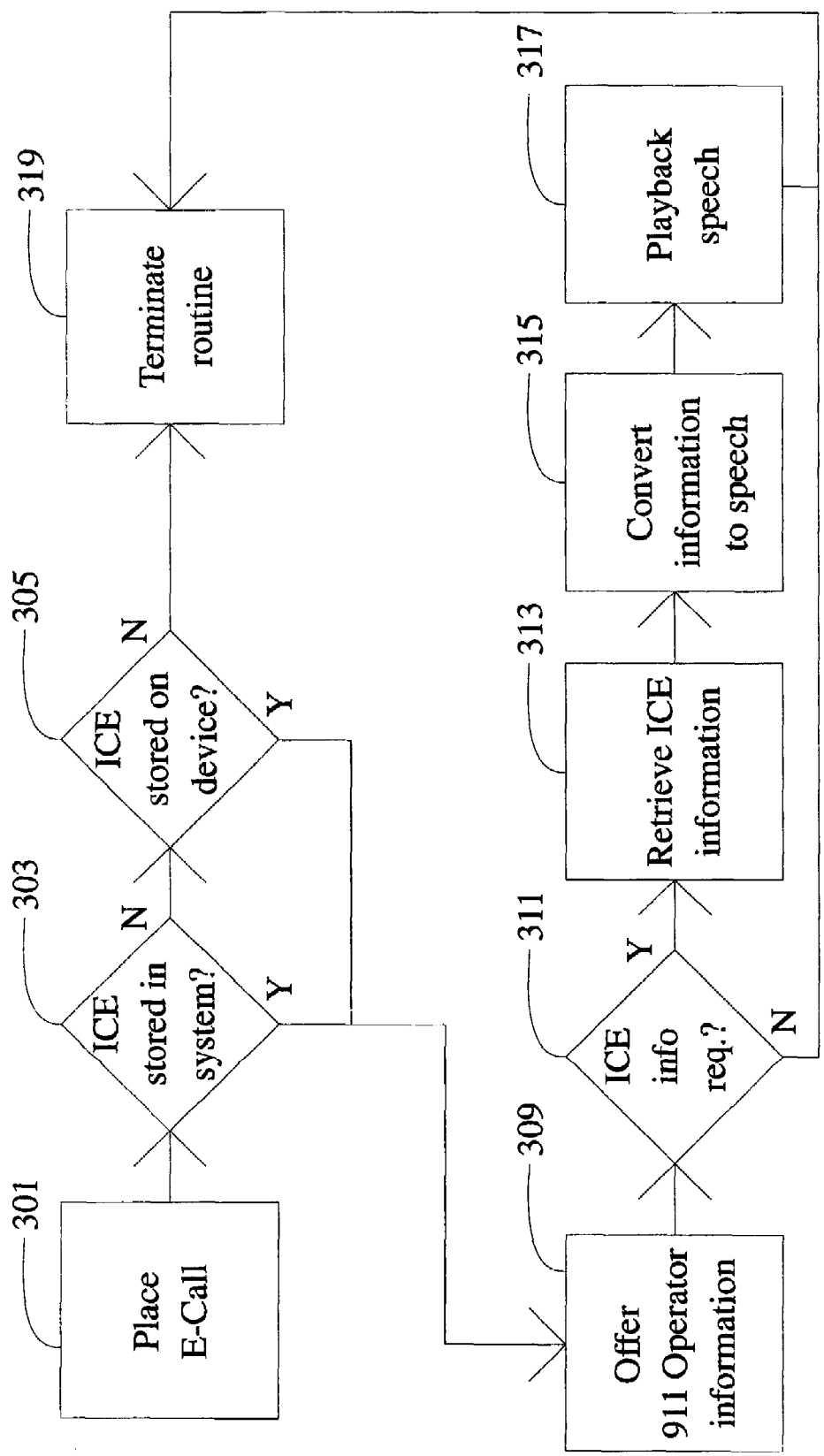
FIG. 3 shows an exemplary illustrative process for providing stored emergency information to an emergency operator.

FIG. 3 shows an exemplary illustrative process for providing stored emergency information to an emergency operator. In this illustrative embodiment, and emergency situation, such as a crash, has occurred. Sensors capable of detecting incidents such as crashes (through airbag deployment, etc) may have instructed the vehicle-based computing system to automatically dial an emergency operator 301.

Once the emergency call has been placed, the system checks to see if emergency information has been stored in system memory 303. This storage could have been done at any previous time, such as during a previous trip, when the vehicle was started, etc. In one embodiment, only emergency information corresponding to wireless devices which are present within a system transceiver range is accessed.

If the information is stored in the system, the vehicle-based computing system offers the emergency operator an option to have the information played. If the information is not in the system, the system checks to see if the information is stored on an available or connected BlueTooth device 305. If the system does not store the information at some previous point, it may need to check a paired or connected device to retrieve the information in the event of an emergency.

If the information is not stored on either the vehicle system or a wireless device, the system terminates the information provision routine 319. If the information is available on a wireless device, the system offers the information to the emergency operator 309.

The system then checks to see if the emergency operator has requested the information 311. The request could be made via a spoken command, such as "yes" or through a DTMF tone, such as pressing "1", or any other suitable means.

If the operator does not request the information, the system terminates the information provision routine 319. Otherwise, the system retrieves the information from where it is stored 313, whether that be the system's memory or a wireless device.

In this illustrative embodiment, the retrieved information is then converted to speech for playback to the emergency operator 315. This allows a voice to speak the information to the operator 317, and for the information to be recorded as part of the call. Alternatively, it may be possible to simply send the information as text or some other digital format to the operator. The information retrieval routine then terminates.

Figure 4:
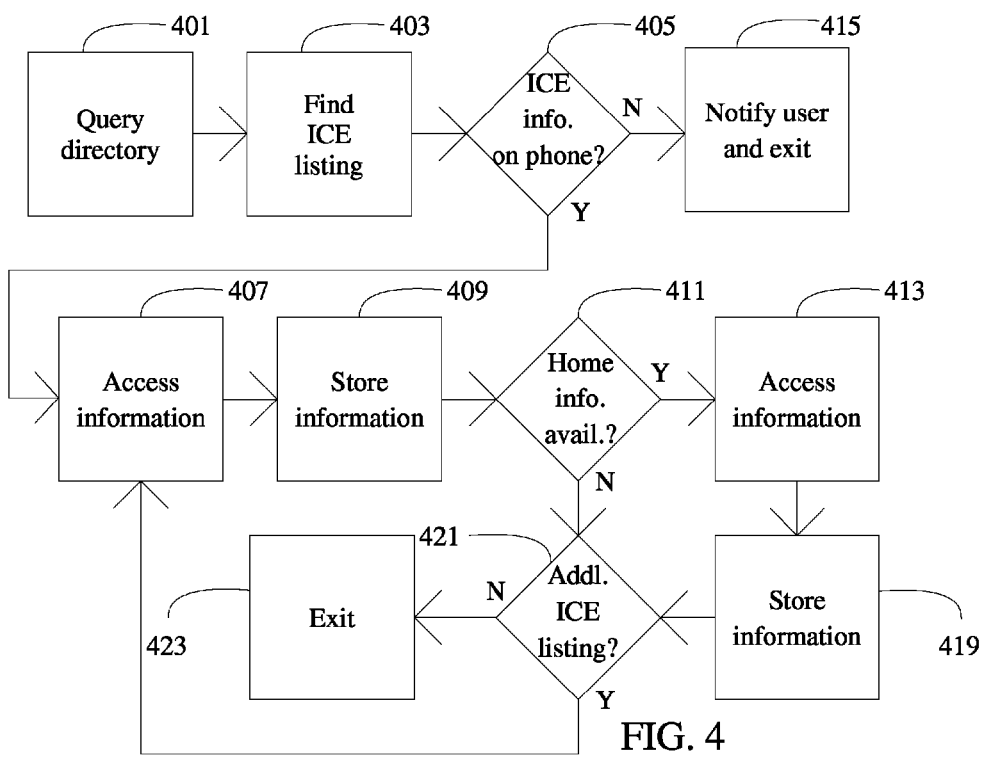
FIG. 4 shows an exemplary illustrative process for retrieval of emergency information from a wireless device.

FIG. 4 shows an exemplary illustrative process for retrieval of emergency information from a wireless device. In this illustrative embodiment, it is assumed that the ICE information is stored in a phone directory, under a heading including the word ICE (which may or may not be in all caps, but is preferably the first three letters in a string, e.g., ice1, ice2, etc. This is not necessary but it makes a string search more effective, since it rules out names having "ice" in them, such as Jerry Rice). It is possible that the ICE information could be stored elsewhere, and the illustrative embodiments can be adapted to retrieve ICE information from a specific location on a device, a specified directory, etc.

Additionally, the ICE information could be stored directly to the vehicle-based system and associated with a given device for a given user (so the system knows when that user is in the vehicle).

In this illustrative embodiment, the system first accesses the device's directory 401. Once the system has access to the directory, it searches for at least one ICE listing 403. A simple way to do this is to look for strings starting with "ice", although strings containing "ice" could also be considered. Other searching methods are also possible.

If the system cannot find ICE information 405, it notifies the user that emergency information could not be found on the device and exits 415. Notification is, of course, not a necessary feature, but may encourage a user to add the appropriate information to the device. If the ICE information is available 405, the system then accesses the information stored with the ICE listing 407.

The system retrieves basic information from the listing and stores that information 409. In this illustrative embodiment, the information is stored in temporary storage, and is maintained until the vehicle is powered down (unless an emergency event is detected). In the event of an emergency event, the vehicle may be provided with a capacitor or other temporary power source that can power the vehicle-based computing system to place an emergency call. In this case, the power source may also provide sufficient power to the temporary memory such that the relevant information is not lost. If the information is lost, however, the system may also be capable of retrieving the information from a wireless device automatically after a call has been placed to emergency services (as shown in FIG. 3).

Once the basic information, such as an emergency contact phone number, has been retrieved from the device, the system checks to see if additional types of information, such as home address or medical records are available on the device 411. If so, this information is retrieved as well 413 and stored 419. If the information is not available, or once the additional information is stored 421, the system checks for any additional ICE listings. For example, a single device may have several ICE contacts listed, and it would be ideal if the system could recognize them all. Of course, even if the system can only recognize and store information for a single ICE contact, this is better than no information at all in an emergency situation.

If there are no ICE listings remaining, the system exits 423, otherwise the system retrieves and stores the information relating to the remaining ICE contacts.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vehicle communication system comprising:
a computer processor in communication with a memory;
a transceiver in communication with the processor and operable to communicate with one or more wireless devices;
wherein the processor is operable to establish communication with a first wireless device through the transceiver;
wherein the processor is further operable to search an address book of the first wireless device for in case of emergency (ICE) information;
wherein the processor is operable to transfer the ICE information stored on the first wireless device to the memory;
wherein the processor is further operable to determine if additional wireless devices other than the first wireless device are within communicable range of the transceiver, and wherein the processor is able to establish communication with, search the address books of, and transfer the ICE information stored on the additional wireless devices to the memory for storage;
wherein the memory is operable to store the transferred ICE information and to store an association with the first and/or additional wireless devices from which the transferred ICE information was transferred; and
wherein the processor is operable to detect a presence of one or more wireless devices and to provide to a remote emergency operator, based at least in part on the wireless devices being detected, the transferred ICE information associated with the detected first and/or additional wireless devices having been stored in the memory.

2. The system of claim 1, further including at least one output controllable by the processor, wherein the processor is operable to inform a user of the non-existence of ICE information via the at least one output.

3. The system of claim 1, wherein the processor is operable to establish communication with the additional wireless devices sequentially.

4. The system of claim 1, wherein the processor is operable to establish communication with a plurality of wireless devices simultaneously.

5. The system of claim 1, wherein the processor is operable to connect to an emergency operator through the first wireless device.

6. The system of claim 5, wherein the processor is operable to retrieve the ICE information from the memory and wherein the processor is further operable to provide the retrieved ICE information to an emergency operator through the connection established through the first wireless device.

7. The system of claim 5, wherein the processor is operable to retrieve the ICE information from a connected wireless device and wherein the processor is further operable to provide the retrieved ICE information to an emergency operator.

8. The system of claim 6, wherein the transferred ICE information is stored as text information and provided to the emergency operator as text information.

9. The system of claim 6, wherein the transferred ICE information is stored as text information, and wherein the processor is operable to convert the text information to speech information and provided to the emergency operator as audible information.

10. A vehicle communication system comprising:
- a computer processor in communication with a memory and a transceiver, the transceiver operable to communicate with one or more wireless devices;
- wherein the processor is operable to detect one or more wireless devices and is operable to search an address book of one or more detected wireless devices for ICE information and to transfer the found ICE information from each device to the memory;
- wherein the processor is further operable to store an association in the memory associating the transferred ICE information with the each device from which the transferred ICE information was transferred; and
- wherein, in the event the processor is requested to transfer ICE information to an emergency operator, the processor is operable to determine which transferred ICE information corresponds to the detected wireless devices and transfer the ICE information corresponding to the detected wireless devices to the emergency operator.

* * * * *